United States Patent [19]
Carnevale

[11] 3,737,123
[45] June 5, 1973

[54] ENERGY ABSORBER FOR AIRCRAFT ARRESTING DEVICE

[75] Inventor: Umberto A. Carnevale, New Castle, Del.

[73] Assignee: All American Industries, Inc., Wilmington, Del.

[22] Filed: Sept. 16, 1971

[21] Appl. No.: 181,026

[52] U.S. Cl. .......................... 244/110 A, 188/65.1
[51] Int. Cl. ............................................. B64f 1/02
[58] Field of Search ............... 188/1 C, 86, 65.1; 244/110 A, 110 R

[56] References Cited
UNITED STATES PATENTS

| | | | |
|---|---|---|---|
| 2,979,163 | 4/1961 | VanZelm et al. | 244/110 A X |
| 2,980,213 | 4/1961 | VanZelm et al. | 244/110 A X |
| 3,200,906 | 8/1965 | Bernard | 244/110 A X |
| 3,093,352 | 6/1963 | Hoffstrom | 244/110 A |
| 3,200,584 | 8/1965 | Mitchell | 188/1 C X |

FOREIGN PATENTS OR APPLICATIONS

| | | | |
|---|---|---|---|
| 1,352,879 | 1/1964 | France | 244/110 R |
| 1,355,687 | 2/1964 | France | 244/110 R |
| 1,357,973 | 3/1964 | France | 244/110 R |

*Primary Examiner*—Milton Buchler
*Assistant Examiner*—Paul E. Sauberer
*Attorney*—Jacob C. Kellem, Arthur G. Connolly and Rudolf E. Hutz

[57] ABSTRACT

The energy absorption for an aircraft arresting device is accomplished by perpendicularly deforming a strong, thick and wearresistant elastomeric coating on the linear payout element. This deformation is accomplished by pressing antifriction elements, such as rollers, into the elastomeric coating, which restores to its original shape upon release from the pressure. The core of the payout element is strong rope or woven nylon tape and it is stored and payed out from a low inertia system, such as a faking box or circular track storage device. A tension control system controls the amount of deforming pressure to maintain the arresting force substantially constant throughout an arrestment or in any other desirable program.

10 Claims, 7 Drawing Figures

PATENTED JUN 5 1973　3,737,123

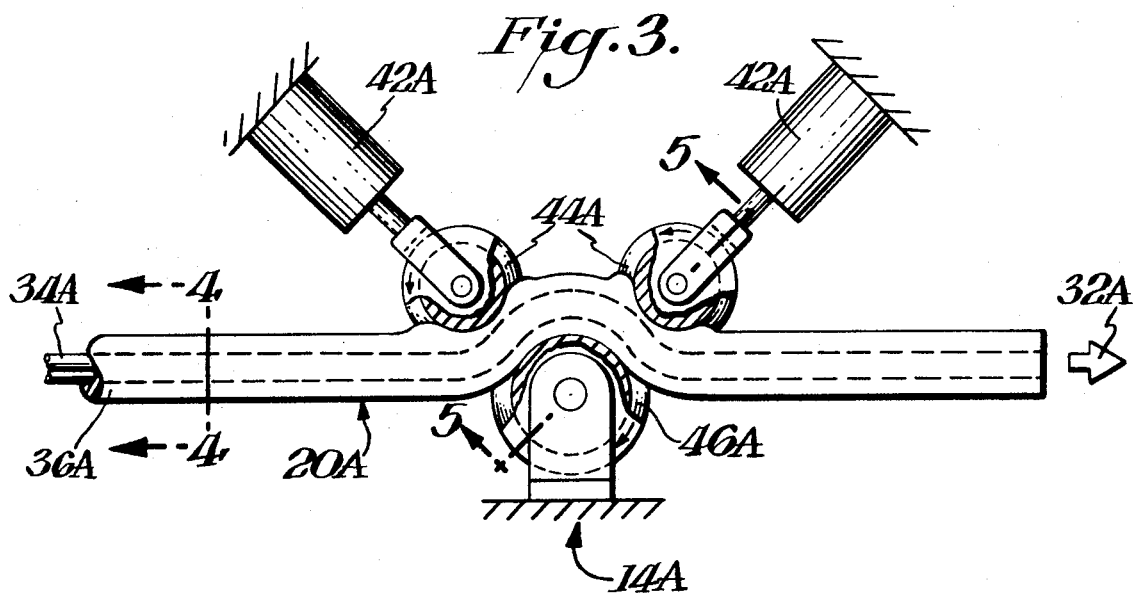
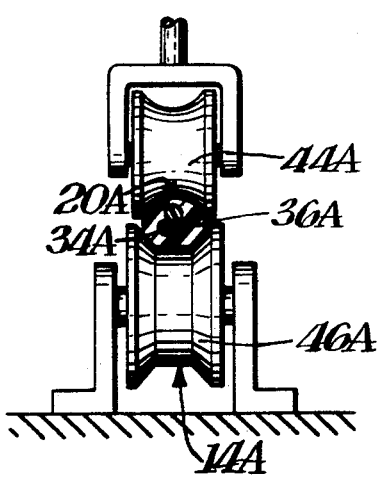
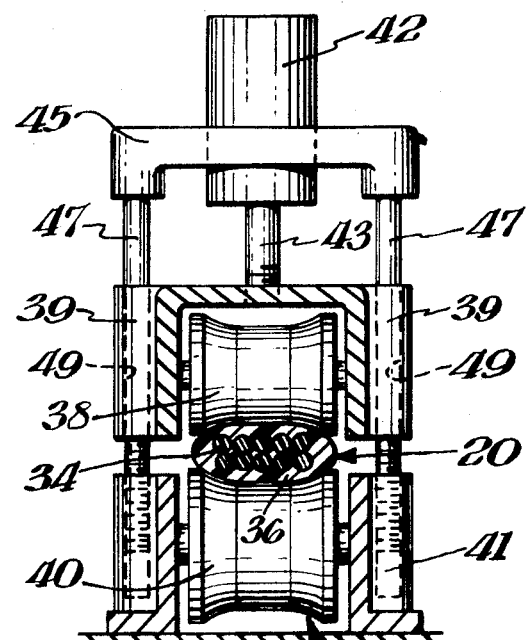

ENERGY ABSORBER FOR AIRCRAFT ARRESTING DEVICE

BACKGROUND OF THE INVENTION

It is highly desirable that an aircraft arresting system efficiently arrest a wide range of light and heavy aircraft having a variety of landing speeds, have low operation inertia and be dependable, strong and wear-resistant, which are the objects of this invention. A widely used type of aircraft arresting system employing a tape and rotary energy absorber is described in U. S. Pat. No. 3,172,625 and a woven tape is described in U. S. Pat. No. 3,220,216. Such woven nylon tape is susceptible to abrasion, wear and damage and the high inertia rotary energy absorber makes it difficult to accommodate different sizes, weights and speeds of aircraft throughout the entire arresting operation.

SUMMARY

Energy is absorbed in an aircraft arresting system by perpendicularly deforming a strong, thick and abrasion and wear-resistant coating on a linear payout element. Such deformation is accomplished by pressing antifriction elements, such as rollers, into the coating as the linear element is payed out during an arrestment. The coating restores to its original shape upon release of the pressure. The low inertia thus imposed on the arresting system is preserved by utilizing a low inertia storage system for the linear payout element, such as a faking box or circular track wound system. The energy absorbing parameter is effectively controlled in accordance with the tension on the payed out line, such as to maintain substantially constant tension throughout the arresting operation. The linear payout element may be a strong rope or elongated tape, such as woven nylon tape, having an elastomeric coating, such as polyurethane, of a thickness from core to exterior substantially equal to that of the core.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 3 is a schematic front view in elevation partially broken away in cross-section of an energy absorber of another embodiment of this invention.

FIG. 4 is a cross-sectional view taken through FIG. 3 along the line 4—4;

FIG. 5 is a cross-sectional view taken through FIG. 3 along the line 5—5;

FIG. 6 is a cross-sectional view taken through FIG. 2 along the line 6—6; and

FIG. 7 is a cross-sectional view taken through FIG. 2 along the line 7—7.

In FIG. 1 is shown an aircraft arresting system 10 installed across airport runway 12. Arresting system 10 includes a pair of energy absorbers 14 installed on opposite sides of runway 12 with cross runway pendant 16 operatively connected to them.

Figure 1:
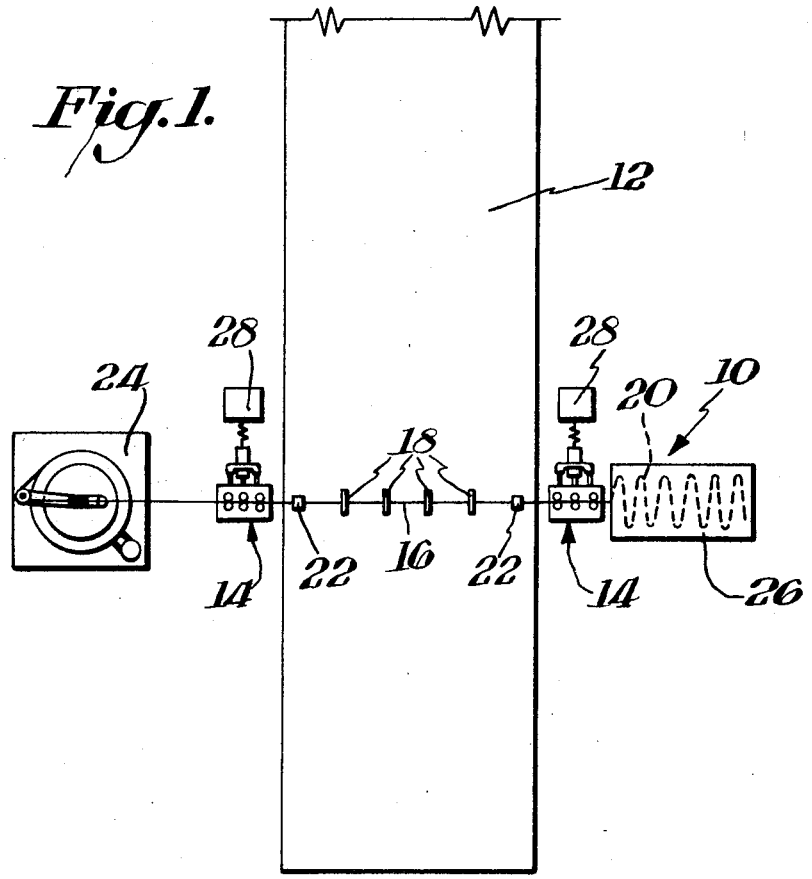
FIG. 1 is a schematic top plan view of one embodiment of this invention installed across an airport runway.

Cross runway pendant 16 is for example made of wire rope or cable or nylon braided rope, as described in U. S. Pat. No. 3,456,908. and 26 Pendant 16 is for example held above the surface of runway 12 by discs 18 of the type described in U. S. Pat. No. 3,010,683. Pendant 16 is connected to linear payout elements 20 by links 22. Linear payout elements 20 extend through energy absorbers 14 into low inertia storage devices 24 and 26 to preserve low inertia characteristics as later described. Circular low inertia storage track device 24 is for example as described in U. S. Pat. No. 3,467,347. Faking box storage device 26 is a commonly used type of storage device for low inertia storage of payout lines and the sinuous line storage pattern provides low inertia payout characteristics. Storage devices 24 and also may include retracting and cooling devices (not shown).

The load applying characteristics of energy absorber 14 are controlled or programmed throughout an arrestment by tension controlling systems 28 which maintain a substantially constant tension in payout elements 20 during an arrestment. Such a system is for example described in commonly assigned U. S. patent application Ser. No. 136,475, filed Apr. 22, 1971.

Figure 2:
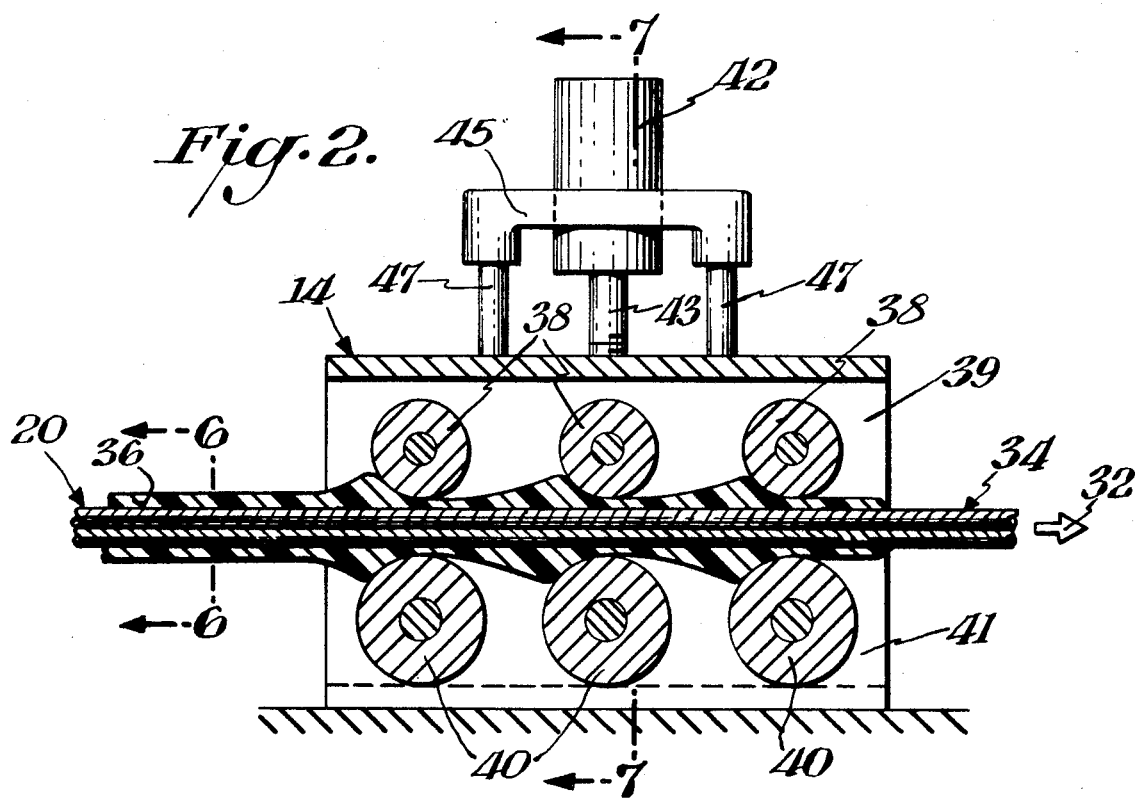
FIG. 2 is a schematic cross-sectional front view in elevation of the enrgy absorber of one embodiment of this invention.

In FIGS. 2, 6 and 7 is shown a schematic representation of energy absorbers 14 in which antifriction cylindrical rollers 38 and 40 are perpendicularly forced against the outer resilient coating 36 of linear payout elment 20, which is pulled out in the direction of arrow 32 during the arrestment of a landing aircraft. Linear payout element 20 has, for example, a woven nylon tape core 34 of the type described in U. S. Pat. No. 3,220,216 with a resilient coating 36 of polyurethane. FIGS. 6 and 7 show undeformed and deformed cross sections of payout element 20. Tape core 34 is for example of woven nylon tape about 4 inches wide and 0.165 inch thick with a breaking strength of about 25,000 lbs. Coating 36 has a single thickness on the order of that of the core to provide a total thickness of payout element 20 of about 0.540 inch.

Opposite rollers 38 and 40 of energy absorber 14 are, for example, of unequal size with smaller rollers 38 being moved with upper carriage 39 toward lower or larger rollers 40 which are mounted on stationary lower carriage 41 to apply a deforming force against purchase element 20 pulled between them in the direction of arrow 32. The deforming force is applied against upper carriage 39 by hydraulic cylinder 42 and piston rod 43. Cylinder 42 is mounted on yoke 45 supported on posts 47 secured to lower carriage 41. A suitable clearance between holes 49 in upper carriage 39 and posts 47 permits upper carriage 39 to be moved downwardly and upwardly on posts 47.

Opposite rollers 38 and 40 are spaced for example 0.31 inch apart from each other at full operative closure. This presses adjacent portions of each into the (0.1875 inch thick) coating a distance of 0.115 inch, which thus constitutes about a 60 percent deformation of the coating. A useful peak tension produced in such a device during a simulated arrestment is for example 4,000 or 5,000 lbs. Simulated testing of the device shown in FIGS. 2, 6 and 7 provided encouraging results and did not wear or damage the tape. The tape became warm but not hot enough to affect coating 36 or composite payout element 20. Protracted cycling tests did, however, break the bond between coating 36 and core 34 and subsequently split the separated coating. A better bond should, however, be easily obtainable, which would prevent or at least substantially delay this splitting problem.

In FIG. 3 is shown another embodiment of this invention in which a composite linear payout element 20A having a nylon rope core 34A and a circular polyurethane coating 36A was deformed between a Y-shaped array of three rollers. A pair of upper rollers 44A act in opposition against a lower roller 46A. The force applied by upper rollers 44A is controlled by hydraulic force-applying cylinders 42A connected to a tension control system of the aforementioned type shown in FIG. 1.

The polyurethane coating on payout elements 20 and 20A has for example the following characteristics:
1. Polymer — L-100 Adipnene from E. I. DuPont DeNemours
2. Curing Agent — 4,4'-Methylene-Bis-(2-Chloranidine)
3. Mixing Temperature — 212°F
4. Curing Temperature & Time — 3 Hrs. at 212°F.
5. Hardness — Durometer A-90
6. Tensile Strength — P.S.I. 4500
7. Elongation at Break — o/o 450
8. Tear — (ASTM D-470) Lb./In. 85
9. Impact Strength — (Izod. Notched) Flexed
10. Abrasion Resistance — (Bureau of Standards Index) 180
11. Resilience — (Bashore) o/o 39
12. Compression Set — Method B 22 Hrs. at 158°F.

Although application of the deforming force by the antifriction rollers against the cable does produce some minor amount of frictional resistance, the primary energy absorption is a result of resilient deformation of the elastomer coating on the payout element. This minimizes the wear on the purchase element because the elastomer is resilient and inherently regains its original shape when the deforming pressure or squeezing force is released from it. The thick elastomer coating also protects the rope or tape core from wear and abrasion on the runway. The composite payout element is therefore extremely strong, dependable and has a long useful life.

The arrestment action of energy absorbers 14 and 14A is inherently low in inertia characteristics. The arresting force can therefore be controlled by finely varying the pressure or squeezing force exerted on the coating. A tension sensing and controlling device 28 effectively controls the pressure characteristics to arrest a wide variety of large, small, heavy and light, slow and fast aircraft. The controlled tension can be maintained constant or programmed throughout an arrestment. It may be rapidly changed by an operator in the control tower or even from the approaching aircraft by radio.

I claim:

1. An energy absorbing system for an aircraft arresting system with a linear payout element comprising an elongated linear payout element having a core capable of withstanding the strong longitudinal forces imposed by an arrested aircraft, a thick deformable and resilient elastomeric coating on said core, an antifriction pressure device operatively engaged with said linear payout element whereby a predominantly deforming force is applied to said linear payout element perpendicularly to its direction of movement as it is pulled through it and substantial energy is predominantly absorbed by the progressive deformation and substantially complete restoration of said elastomeric coating, and a storage device for holding said linear payout element and feeding it to said antifriction pressure device.

2. A system as set forth in claim 1 wherein said antifriction pressure device comprises rollers and force-applying means connected to said rollers for forcing them into said elastomeric coating to deform it.

3. A system as set forth in claim 2 wherein said force-applying means comprises hydraulic cylinder and piston means.

4. A system as set forth in claim 1 wherein said storage device comprises a low inertia storage device.

5. A system as set forth in claim 4 wherein said low inertia storage device comprises a faking box.

6. A system as set forth in claim 4 wherein said low inertia storage device comprises a circular track storage device.

7. A system as set forth in claim 1 wherein said linear payout element comprises a tape core and an elastomer coating having a thickness from core to exterior about the order of the thickness of said core.

8. A system as set forth in claim 7 wherein said linear payout element comprises a nylon tape core and a polyurethane elastomer coating upon said core.

9. A system as set forth in claim 1 in combination with tension control means operatively connected to said antifriction pressure device whereby said antifriction pressure device maintains a predetermined tension program in said linear payout element during the energy absorbing cycle of said system.

10. A system as set forth in claim 9 wherein said program maintains a substantially constant tension in said linear payout element throughout an arrestment.

* * * * *